(No Model.)
I. N. GILLOCK.
CAR COUPLING.
No. 356,685. Patented Jan. 25, 1887.
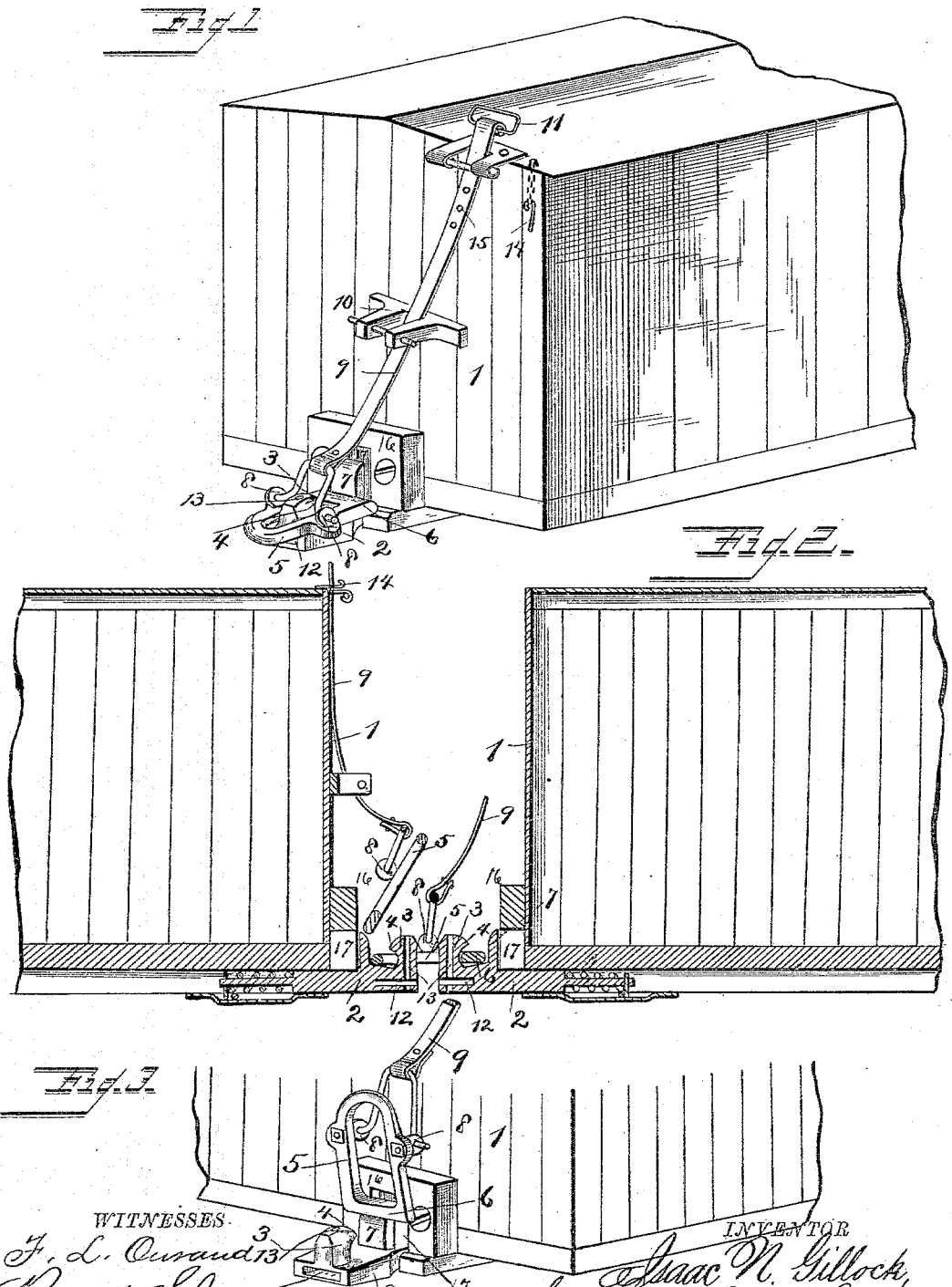

UNITED STATES PATENT OFFICE.

ISAAC N. GILLOCK, OF HORSE CAVE, KENTUCKY, ASSIGNOR OF ONE-HALF TO JOSEPH BERRY, OF SAME PLACE.

CAR-COUPLING.

SPECIFICATION forming part of Letters Patent No. 356,685, dated January 25, 1887.

Application filed November 6, 1886. Serial No. 218,174. (No model.)

*To all whom it may concern:*

Be it known that I, ISAAC N. GILLOCK, a citizen of the United States, and a resident of Horse Cave, in the county of Hart and State of Kentucky, have invented certain new and useful Improvements in Car-Couplings; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of the end of a car provided with my improved coupling. Fig. 2 is a vertical sectional view of the ends of two cars coupled by my improved coupling, and Fig. 3 is a perspective view of one of the draw-heads, showing the coupling-link raised.

Similar numerals of reference indicate corresponding parts in all the figures.

My invention has relation to that class of automatic car-couplings in which a link is hooked with its ends over draw-heads having upwardly-projecting curved hooks engaging the link; and it consists in the improved construction and combination of parts of such a coupling, as hereinafter more fully described and claimed.

In the accompanying drawings, the numeral 1 indicates the end of the car, upon the under side of which the draw-head 2 is attached in the usual manner.

The draw-head is formed upon the upper side with an upwardly-projecting horn or hook, 3, the end of which is provided with a rearwardly-projecting portion, 4, and the forward side of which is preferably rounded, and a link, 5, is engaged by the said hook, having its inner square end, 6, inserted in the space between the hook and the upwardly-projecting portion 7 of the draw-head, which portion bears against the front end of the car, the space behind the hook being of sufficient width to hold the said end of the link, while the space between the rearwardly-pointing end of the hook and the upwardly-projecting portion 7 or the stop being less than the width of the end piece of the link. The link is provided at its middle with a bail, 8, pivoted with its ends to the side pieces of the link, and a flat bar or rod, 9, is pivotally secured with its lower end to the doubled portion of the bail, being carried upward in rectangular bearings 10 upon the front of the car to the top, where it is provided with a handle, 11.

The end of the draw-head is formed with a recess, 12, similar to the recess found in the draw-heads used with the pin-and-link coupling, and a perforation, 13, is formed in the draw-head through the horn and through the recess, serving for the insertion of a common coupling-pin, the recess serving for the reception of a common coupling-link when this coupling is used with the common pin-and-link coupling.

When the coupling is to be used, the link of one draw-head is raised out of engagement with the hook, the square end piece of the link slipping out of the space between the hooked end and the stop when tilted upward, being thinner than it is wide, and the link is held raised above the hook by inserting a pin, 14, through one of a series of perforations, 15, in the upper portion of the lifting-rod, above the upper bearing, and the link of the opposite coupling may now slip over the hook with its outer round end, being thus engaged and held by the hook, coupling the cars together, to permit the draw-head to operate as a bumper and to prevent the link from slipping down behind the projection 7 when it is drawn up out of engagement with the hook 4. A block, 16, having a recess, 17, in its lower portion, is secured upon the end of the car in such a manner that the projection 7 can be pushed back into the recess when the cars come together.

The link may be uncoupled by pulling upward upon the lifting-rod, when the rounded outer end of the link will be raised up from the hook, allowing the cars to pass freely from each other.

The square end piece of the link will be retained in the hook when the rod is drawn upward, on account of its being wider than the space between the hooked end and the stop, until the link is raised in an upright position, when it may be slipped out through the said space.

Having thus described my invention, I claim and desire to secure by Letters Patent of the United States—

1. In a car-coupler, the combination of a draw-head having a hook upon its end and an upwardly-extending projection upon its intermediate portion, a detachable link having its rear end square, a bail secured to the middle of said link, a flat bar secured at its lower end in said bail, rectangular bearings upon the end of the car, and a handle upon the upper end of said bar.

2. In a car-coupler, the combination of a draw-head having a hook upon its end and an upwardly-extending projection upon its intermediate portion, a recessed block upon the end of the car, a detachable link having its rear end square, a bail secured to the middle of said link, a flat bar secured to said bail, and rectangular bearings upon the end of the car.

In testimony that I claim the foregoing as my own I have hereunto affixed my signature in presence of two witnesses.

ISAAC N. GILLOCK.

Witnesses:
WM. PREWITT,
GEORGE W. HARBISON.